June 17, 1952 J. M. WALLACE 2,601,188
AUTOMATIC RECLOSING CIRCUIT INTERRUPTER
Filed Aug. 28, 1947 2 SHEETS—SHEET 2
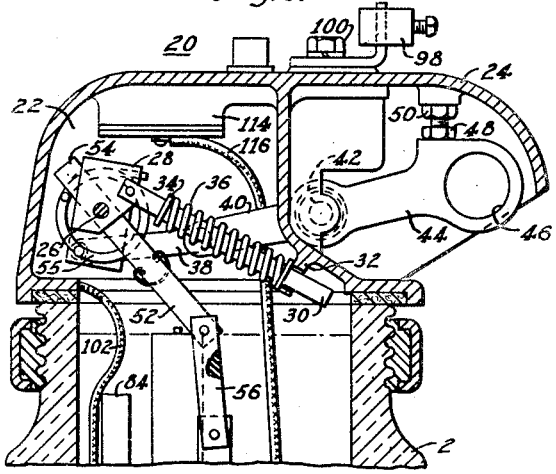
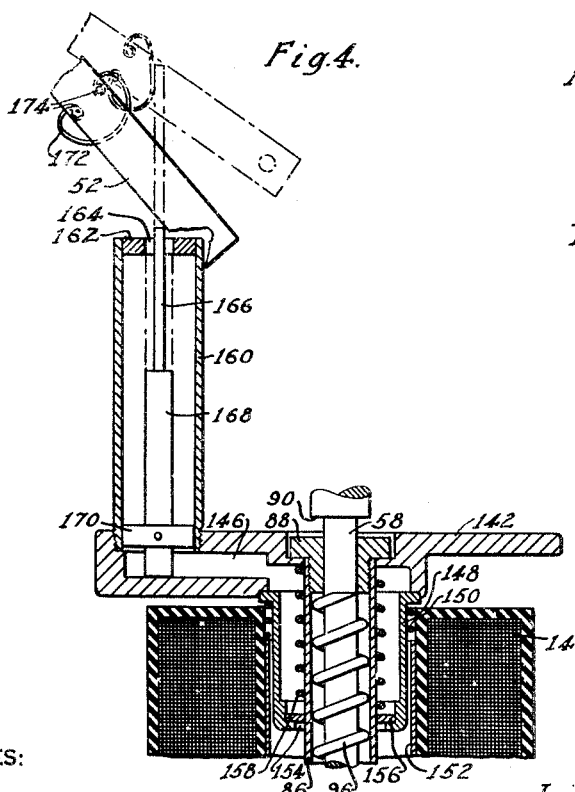
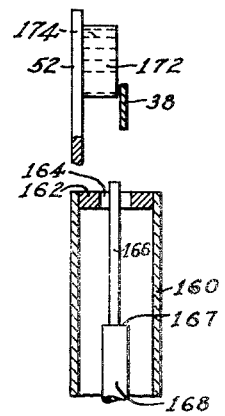
WITNESSES:
N. F. Susser
Wm. L. Groove
INVENTOR
James M. Wallace.
BY Ralph H. Swingle
ATTORNEY Patented June 17, 1952

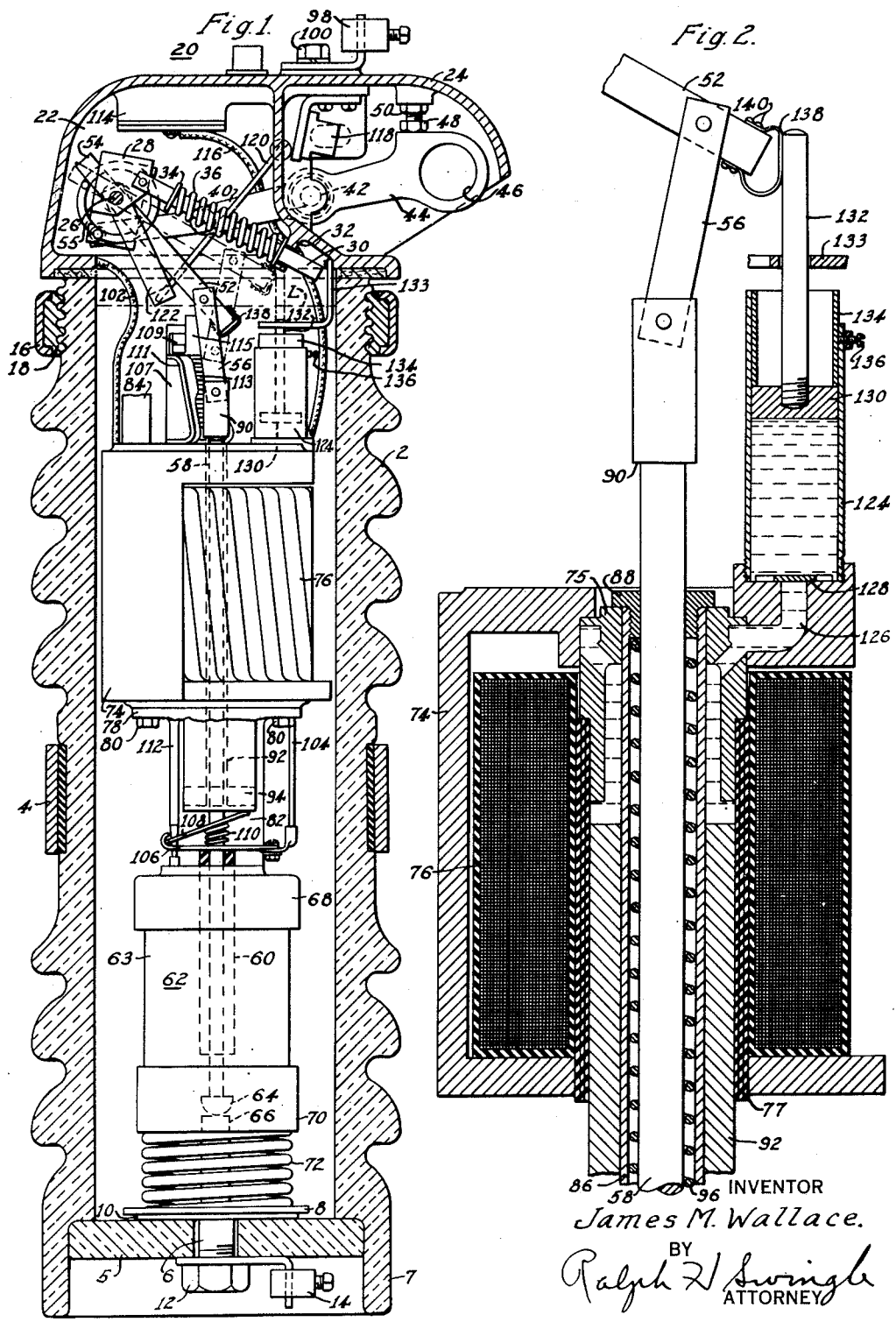

2,601,188

UNITED STATES PATENT OFFICE 2,601,188

AUTOMATIC RECLOSING CIRCUIT INTERRUPTER

James M. Wallace, East McKeesport, Pa., assignor to Westinghouse Electric Corporation, East Pittsburgh, Pa., a corporation of Pennsylvania Application August 28, 1947, Serial No. 771,123

10 Claims. (Cl. 200—89)

This invention relates generally to automatic reclosing electric circuit interrupting devices, and more particularly to such devices having differing circuit opening times on closely successive circuit interrupting operations.

Circuit interrupting devices of this type are constructed to operate in response to continuing overloads on the circuit to automatically operate through a cycle of operations comprising a predetermined number of circuit opening and closing operations at the end of which the interrupter remains open until manually reclosed. Many interrupters of this type have provisions such that, in any such cycle of operations, the first one or two circuit opening operations occur relatively rapidly, and later circuit opening operations are delayed. One difficulty which has been encountered with such interrupters occurs when the interrupter is manually reclosed following an automatic cycle of operation, because such manual reclosure usually occurs only after a relatively long open circuit period and the circuit has then lost its diversity factor. In other words, all motors and similar devices on the circuit which require higher currents for starting than for running and in most cases do not run continuously, such as motors for refrigerators, all these will be ready to start when the interrupter is manually reclosed. This means that the initial current demand is so high as to make it impossible to reenergize the line because with an instantaneous first automatic opening, the interrupter will immediately reopen the circuit in response to the momentary overload encountered due to the simultaneous starting current demand of all devices connected in the circuit.

One object of this invention, therefore, is to provide an automatic reclosing circuit interrupter which is automatically operable through a cycle of a predetermined number of closely successive circuit opening and closing operations, the first one or more circuit opening operations of which are fast and later ones being relatively slow, with the interrupter maintained open at the end of such cycle of operation, with novel means causing a circuit interrupting operation which occurs immediately following manual reclosure of the interrupter to take place only after a time delay period.

A more specific object of this invention is to provide in a circuit interrupter of the type described having fluid dashpot means for delaying only final circuit interrupting operations in any cycle of closely successive circuit interrupting operations, with novel means causing said dashpot means to delay a first circuit interrupting operation which occurs soon after a manual reclosing of the interrupter following a complete automatic cycle of operation.

Another object of this invention is to provide a circuit interrupter of the type described having counting means actuated on each operation of the interrupter to interpose means for delaying later circuit interrupting operations in any cycle of a predetermined number of closely successive operations, and where said counting means automatically resets after the lapse of a predetermined time, with novel means for preventing resetting of said counting means when the interrupter is automatically held at open circuit position at the end of such a cycle of operation.

Another object of this invention is to provide for a circuit interrupter of the type described, having fluid operated counting means adapted to alter operation of the interrupter after one or more closely successive operations thereof and biased to slowly reset, with novel means preventing resetting of the counting means when the interrupter is at an open circuit position.

Still another object of this invention is to provide in a circuit interrupter of the type described having fluid actuated counting means for counting a predetermined number of closely succeeding operations of the interrupter and then preventing subsequent reclosing, and/or for counting a lesser number of operations to thereafter delay circuit opening operations of the interrupter, with novel means for preventing resetting of such counting means at least during the time the interrupter is maintained at an open circuit position.

These and other objects of this invention will become more apparent upon consideration of the following description of preferred embodiments thereof, when taken in connection with the attached drawings, in which:

Figure 1 is a longitudinal sectional view of a reclosing circuit interrupter embodying this invention, with the parts within the interrupter casing being shown in elevation;

Fig. 2 is an enlarged partial longitudinal sectional view of the interrupter shown in Fig. 1, with certain of the parts being omitted;

Fig. 3 is a longitudinal sectional view of the upper portion of a reclosing interrupter like that shown in Fig. 1, but illustrating a modification;

Fig. 4 is an enlarged longitudinal cross-sectional view of an intermediate portion of the interrupter shown in Fig. 3, with the plane of the section passing through the counting device; and Fig. 5 is a partial sectional view of the interrupter shown in Figs. 3 and 4, taken substantially at right angles to the section of Fig. 4.

While, for purposes of illustration, this invention is shown on the drawings as being embodied in one particular form of automatic reclosing circuit interrupter, it is to be distinctly understood that the invention may be applied to other types of automatic reclosing circuit interrupters as well. The particular interrupter disclosed herein is in many respects similar to that disclosed and claimed in the copending application of H. L. Rawlins and J. M. Wallace, Serial No. 602,876, filed July 2, 1945, on Circuit Interrupters, and assigned to the same assignee of this invention. This interrupter is adapted to be housed in a substantially cylindrical casing 2 of insulating material, such for example as porcelain or the like, with the casing adapted to be supported at an intermediate portion as by a supporting bracket 4. As viewed in Fig. 1, the lower end of casing 2 is closed by a closure disk 5 cemented or otherwise secured against a shoulder provided in the lower end of casing 2, at a distance above the lower end of the casing, so as to provide a skirt 7 for concealing the lower terminal connection. Bottom closure disk 5 for casing 2 is provided with a central aperture for receiving a terminal bolt 6 having an enlarged head 8 adapted to be seated against the closure disk on a compressible gasket 10, of cork or similar compressible sealing material. Terminal bolt 6 is provided with a nut 12 for securing it in place, and for securing a terminal fixture 14 thereto.

Adjacent the upper end of casing 2 there is provided a channeled supporting ring 16 secured to the casing in any desired manner, such for example as by cast metal 18 interlocking with the channeled ring and with peripheral grooves provided about the upper end of casing 2. A cover casting 20 for the upper end of casing 2 is adapted to be secured on the upper end of casing 2 by any desired means, such as by bolts or the like (not shown) cooperating with the cover casting 20 and supporting ring 16. Cover casting 20 is provided with a hollow chamber 22 opening to the interior of casing 2, and with an integral hood 24, for a purpose to be described.

Within chamber 22 of the cover casting there is provided a supporting shaft 26 extending transversely thereof with its ends mounted in opposite sides of the chamber, for pivotally supporting an inverted U-shaped spring support 28. Support 28 is provided with apertures in the leg portions thereof for pivotal mounting on shaft 26, and one leg is pivotally connected with one end of a rod 30, with the other end of the rod being slidable in the aperture of a lug 32 provided integral with cover casting 20. A spring supporting flange or disk 34 is secured on rod 30, to form the reaction point for one end of a coiled compression lockout spring 36, the other end of which reacts against a washer seated on lug 32. It will be observed that spring 36 acts to bias support 28 in a counterclockwise direction about shaft 26, but such movement of support 28 is normally prevented by toggle means comprising a toggle lever 38 pivotally connected to one leg of support 28 at one end, and pivoted at its other end to another toggle lever 40 which, in turn, is pivotally mounted on cover casting 20, as at 42. Toggle lever 40 is provided with an integral handle extension 44 having a hookeye 46 in the outer end thereof and adapted, in its normal position shown in Fig. 1, to engage a stop bolt 48 provided beneath hood 24 which may be secured in an adjusted position by means of a lock nut 50. It will be noted that in the normal position of the parts illustrated in Fig. 1, toggle levers 38 and 40 are held at an overcenter position by spring 36, with handle 44 defining this overcenter position by its engagement with stop bolt 48. Moreover, in this position of the parts, handle 44 is located substantially entirely beneath hood 24.

A contact actuating lever 52 is also pivotally mounted on shaft 26 within cover chamber 22 and has its inner end 54 extended so as to be engaged by one end of a spring 55 coiled about shaft 26, with the other end of this spring reacting against the bight portion of support 28. Inasmuch as support 28 is normally held against movement by the toggle levers described above, it is apparent that spring 55 acts to normally bias actuating lever 52 in a clockwise direction about shaft 26. Actuating lever 52 is connected by links 56 of insulating material, such for example as fiber or the like, to the upper end of a contact rod 58. The contact rod extends downwardly through casing 2 and has adjacent its lower end at the point where it enters an interrupter chamber 62, a sleeve 60 thereon which may be of any desired insulating material, such as fiber or a molded insulating material. The lower end of contact rod 58 is provided with a contact head 64 for engagement with a stationary contact 66 secured in the interrupter chamber. In general, the interrupter chamber 62 comprises a tubular member 63 of insulating material such as fiber or the like, with a top cap 68 apertured to slidably receive the contact rod and its sleeve 60, and a bottom cap 70 is provided to which stationary contact 66 is secured. Bottom cap 70 of the interrupter chamber is electrically connected with terminal bolt 6 by means of a coiled compression spring 72 of a resilient electrical conducting material, which reacts between the head 8 of terminal bolt 6, and bottom cap 70 of the interrupter chamber.

Contact rod 58 also passes downwardly through apertures provided in the legs of a generally U-shaped frame 74 which supports an annular solenoid coil 76. An apertured collar 75 is held against an interior shoulder provided about the aperture in the top leg of supporting frame 74 by a cylindrical dashpot sleeve 77, preferably of a molded insulating material, and this, in turn, is held in place by engagement of the lower end of sleeve 77 with the top plate 78 of a generally rectangular shaped supporting frame, which is secured to the lower leg of solenoid supporting frame 74 by means of bolts 80. Top supporting plate 78 may be integral with spaced side plates 82, and these, in turn, may be integral with top cap 68 of the interrupter chamber. Solenoid supporting frame 74 is thus secured to interrupter chamber 62, and these parts are all adapted to be supported from cover casting 20 by means of supports 84 connected between the top leg of frame 74 and the cover casting, so that all the parts may be inserted or removed from casing 2 as a unit with cover casting 20.

Contact rod 58 is provided with an actuating tube 86 thereon within solenoid coil 76, and the upper end of this tube has a flanged collar 88 adapted to be seated on top of collar 75 and to engage a shoulder 90 provided on the contact rod, for a purpose to be described. A substantially cylindrical core 92 is adapted to be slidably mounted between actuating sleeve 86 and dashpot sleeve 77 in a piston-like manner, and is normally maintained at the position shown in Fig. 1 of the drawings by a light coil compression spring 96, which reacts between the closed lower end of core 92 and collar 88 on actuating sleeve 86. The lower end of core 92 is provided with lateral vent openings 94, so that any fluid trapped within the core is free to escape during movement of the core.

The circuit through the interrupter thus far described extends from a terminal fixture 93 secured by a bolt 100 to cover casting 20, by way of a flexible conductor 102 to one terminal of solenoid coil 76, and then by a flexible conductor 104 to a supporting plate 106 secured on contact rod 58. The circuit continues in the closed circuit position of the interrupter, to fixed contact 66, through spring 72 to terminal bolt 6 and terminal fixture 14. It will be observed that solenoid coil 76 being connected in series in the circuit through the interrupter will be responsive to overload currents above a predetermined value to exert sufficient force to attract solenoid core 92 upwardly. Upward movement of core 92 results first in compressing light coil spring 96 until the bottom of the core engages the lower end of actuating sleeve 86 which is then raised into engagement with shoulder 90 on contact rod 58 to separate contact head 64 from fixed contact 66. This causes an arc to form between the contacts and to cause further upper movement of contact rod 58 due to pressure built up within interrupter chamber 62. Upward movement of contact rod 58 stresses spring 55 so that when the arc is finally extinguished and solenoid coil 76 is de-energized, spring 55 is free to move contact rod 58 downwardly to reclose the circuit.

Opening and closing of the interrupter in the manner described above would continue indefinitely on continuing overloads, and to avoid this an integrating or counting means is provided, which is identical with that more particularly described in Wallace et al. Patent 2,442,477, issued June 1, 1948, to the same assignee of this invention. Such an integrating or counting means comprises a tubular member 107 secured on the top leg of solenoid supporting frame 74, with a notched piston 109 therein adapted to be advanced each time the circuit opens by a generally U-shaped pawl 111, guided for sliding and tilting movement on a guide rod 115 also secured to the upper leg of frame 74. Pawl 111 is normally held at a position where a portion thereof overlies flanged collar 88 on actuating sleeve 86, by a coiled compression spring 113 mounted on guide rod 115. A check valve controlled inlet (not shown) is provided for the lower end of tubular member 107 so that when the interrupter operates to open the circuit and actuating sleeve 86 is moved upwardly, the flanged collar 88 tilts pawl 111 into engagement with a notch of piston 109 and moves it upwardly a predetermined distance where it remains when the contacts reclose. There is some leakage between piston 109 and tubular member 107 so that if the fault clears upon a first circuit reclosing operation, the piston 109 will slowly sink back to its original position. However, if the fault has not cleared upon the first reclosure of the interrupter, it will immediately reopen and this time pawl 111 will engage a lower notch of piston 109 and raise it a further amount. If the fault is still present on the second reclosure of the interrupter, it will continue to open and close the circuit until piston 109 has been advanced an amount sufficient that the upper end thereof engages toggle lever 38 and moves this toggle lever upwardly over-center so as to permit lockout spring 36 to rotate support 28 clockwise and hold contact rod 58 at an open circuit position. Such an operation will cause handle 44 to project beneath hood 24 to present a readily visible indication of the lockout condition of the interrupter.

In order to provide a time delay for a circuit opening and closing operation of the interrupter, use is made of the operation of core 92 in dashpot sleeve 77, and of the liquid displaced by movement of the core. For the purpose of delaying a circuit closing operation, contact rod 58 has a latch plate 108 pivotally mounted on supporting plate 106 of the rod, and latch plate 108 has a relatively large opening for receiving the contact rod to permit pivotal movement thereof, it being normally biased upwardly by a coiled compression spring 110. Latch plate 108 is also provided adjacent its pivot point with an aperture for receiving a latch rod 112 fixedly mounted between cap 68 of the interrupter chamber and support plate 78. The lower end of latch rod 112 is reduced in section, and the aperture in the latch plate which receives rod 112 is of a size such that upon movement of contact rod 58 to an open circuit position, latch plate 108 may pivot in a clockwise direction while compressing spring 110 to relieve any tendency of the aperture therein to bind on latch rod 112. However, upon attempted reclosing movement of contact rod 58, latch plate 108 will bind on rod 112 due to the action of spring 110, to thereby latch the contact rod in an open circuit position. This latch is adapted to be released by downward movement of solenoid core 92, when the lower end thereof engages the outer end of latch plate 108. However, downward movement of core 92 is relatively slow due to its dashpot action in cooperation with sleeves 77 and 86, so that reclosing movement of contact rod 58 will be correspondingly slow until the reduced section at the lower end of latch rod 112 is reached, whereupon latch plate 108 can no longer bind on latch rod 112 and contact head 64 will rapidly move into final engagement with fixed contact 66.

The interrupter may be provided with certain accessories, such as a support 114 for a lightning arrester unit electrically connected between the cover casting and frame 74 by a conductor 116, so that lightning surges will by-pass solenoid coil 76 and operation of the interrupter will be prevented. A counter 118 may also be provided supported beneath hood 24 for actuating by a link 120 connected with an actuating lever 122 which is pivoted on shaft 26. Lever 122 may be movable with actuating lever 52 so as to register the number of operations of the interrupter on counter 118, which is visible from the exterior of the interrupter.

For the purpose of providing a time delay between the occurrence of an overload sufficient to attract core 92 upwardly and cause a circuit interrupting operation, and the time the contacts are actually separated, collar 75 and the upper leg of supporting frame 74 are provided with a passage 126 leading from the upper end of the dashpot space between sleeves 77 and 86 to a tubular chamber 124. Passage 126 is provided at the end thereof within tubular chamber 124 with a check valve disk 128 adapted to be seated thereon to permit flow of fluid solely in the direction into chamber 124. Preferably chamber 124 is formed by a cylindrical tube threaded into a threaded socket provided on the upper leg of solenoid supporting frame 74. A piston 130 is freely slidably mounted in chamber 124 and the piston 130 carries a rod 132 which extends upwardly therefrom. An angled bracket 133 secured to cover casting 20 is provided with an opening for guiding piston rod 132 during movement of the piston 130 in chamber 124.

In operation, with casing 2 filled with an arc-extinguishing fluid such as oil or the like, up to the level L, it will be observed that normally piston 130 will be seated on check valve 128 so that when solenoid core 92 is attracted upwardly to interrupt the circuit, the liquid displaced thereby will be forced through passage 126 to unseat check valve 128 and move piston 130 upwardly a distance predetermined by the amount of fluid displaced. The distance piston 130 is moved upwardly may or may not bring it into engagement with a stop sleeve 134 secured in chamber 124, as by a setscrew 136 or the like, depending upon the position stop sleeve 134 occupies. Sleeve 134 may be adjusted so that a single circuit opening operation will cause piston 130 to be advanced substantially into engagement with stop sleeve 134, or the adjustment may be such that two closely succeeding circuit opening operations are required before piston 130 is advanced to engage stop sleeve 134. In either case, the circuit opening operations which occur before piston 130 engages stop sleeve 134 will occur relatively rapidly due to the fact that the dashpot formed by sleeves 77 and 86 and core 92 is substantially freely vented through passage 126, there at least being no substantial opposition to the flow of liquid through this passage. When core 92 moves downwardly during the circuit closing operation following a first circuit opening operation, check valve 128 will seat on the upper end of passage 126 to thus close the upper end of the dashpot space between sleeves 77 and 86 so that downward movement of core 92 will be relatively slow since liquid must be drawn into the dashpot space past the relatively small clearances between core 92 and sleeves 77 and 86. If the interrupter remains closed after a first circuit interrupting reclosing operation, piston 130 will gradually sink back to its normal lower position due to the force of gravity, but this movement will be quite slow due to the necessity of displacing liquid trapped below piston 130 past the relatively small clearance between piston 130 and the wall of chamber 124. However, if the fault or overload has not cleared upon reclosing of the contacts, the interrupter will again open and reclose substantially in the same manner as the first operation provided piston 130 has not been moved into engagement with stop sleeve 134 on the first operation. As soon as piston 130 is moved into engagement with stop sleeve 124, be it on the first or on the second circuit interrupting operation, if the overload condition still exists upon a subsequent closing operation, the interrupter will immediately reopen the circuit, but this time liquid cannot freely escape through the vent passage 126 from the dashpot space between sleeves 77 and 86 so that the upward movement of core 92 will be much slower than on the preceding interrupting operation or operations, due to the necessity of forcing liquid trapped in the dashpot space past the relatively small clearance between core 92 and sleeves 77 and 86. Thus, with the structure disclosed, the interrupter will always operate on closely succeeding circuit interrupting operations to separate the contacts at a relatively rapid rate on the first one or two of such interrupting operations, and at a slower rate on succeeding operations. However, if the fault clears before automatic lockout of the breaker occurs, piston 130 will reset so that the next time a continuing fault occurs, the same sequence of a first one or two fast interrupting operations followed by slower circuit interrupting operations will occur.

When the circuit interrupter shown in Figs. 1 and 2 has operated the predetermined number of times required to actuate toggle levers 38 and 40 upwardly over center to cause the breaker contacts to be held open, it is apparent that piston 130 could then reset so that when the interrupter is manually reclosed at a later time, it would then be prepared to go through the same sequence of fast and slow circuit interrupting operations when a fault again appeared on the line. However, to overcome the difficulty previously mentioned of such an interrupter being impossible to reclose manually due to the momentary overload current encountered in attempting to reenergize a circuit which has been out of service for an appreciable length of time, there is provided in accordance with this invention a bowed leaf spring 138 attached to the outer end of contact actuating lever 52 by means of suitable fastening means 140 and positioned so as to engage piston rod 132 when the latter has attained a position corresponding to the position of piston 130 where it engages stop sleeve 134, this being the position of the piston wherein it causes subsequent circuit opening operations to be delayed by the dashpot action of core 92 operating between sleeves 77 and 86. It is apparent, therefore, that spring 138 will engage piston rod 132 when the interrupter contacts are held at an open circuit position so as to exert a lateral force on the upper end of the guide rod causing the piston 130 to bind in chamber 124 and be held at the position shown in Fig. 2 of the drawings, so long as the contacts are held at the open circuit position illustrated. Now, when the interrupter is manually reclosed by appropriate operation of handle extension 44 and a momentary overload is encountered when the circuit is closed, the interrupter will not immediately reopen the contacts because circuit opening movement of core 92 is then delayed by the dashpot formed by sleeves 77 and 86.

A further advantage of the foregoing structure is that holding spring 138 may be arranged so as to engage piston rod 132 each time the contacts separate to open the circuit so that resetting of piston 130 cannot occur while the contacts are open, but can take place only after the circuit has been closed. This obviously permits more accurate control of the various circuit interrupting operations in regard to those particular operations which are to be delayed by the dashpot action described above.

In the modification of the invention shown in Figs. 3, 4 and 5, the interrupter is very similar to that described above in connection with Figs. 1 and 2 of the drawings, having many identical parts, and accordingly such parts have been designated with the same reference numerals and their description will not be repeated. The major difference between the two embodiments of this invention is that the device shown in Figs. 1 and 2 employs two separate counting devices at 107 and 124, one being for the purpose of counting a predetermined number of closely successive operations of the interrupter to cause the contacts to be held at their open circuit position at the conclusion of such predetermined number of operations, and the other counting device provided for the purpose of counting a lesser number of closely succeeding operations of the interrupter to then cause subsequent closely successive interrupting operations to be delayed.

As illustrated more particularly in Fig. 4, a top supporting plate 142 for a solenoid coil 144 is provided with a fluid passage 146 opening at its inner and at the upper end of a cylindrical sleeve 148 held against a shoulder surrounding the opening into passage 146 by a coil compression spring 150 which reacts between a flange at the upper end of sleeve 148 and a dashpot cylinder sleeve 152 positioned within the central opening through coil 144. The lower end of sleeve 148 is provided with an inlet opening 154 which is larger than actuating sleeve 86 which passes through this opening, with inlet opening 154 being controlled by a check valve disk 156 normally held in a position covering the inlet opening by a coil compression spring 158 reacting between the disk and top leg 142 of the solenoid supporting frame.

The outer end of passage 146 communicates with the lower end of a cylindrical sleeve 160 threadedly mounted in an opening provided in top leg 142 and having a plug disk 162 secured in the upper end thereof. Disk 162 is provided with a substantially central opening 164 for receiving a rod 168 mounted in sleeve 160, which rod has a piston 170 secured adjacent the lower end thereof. Rod 168 has a reduced extension 166 which extends upwardly through opening 164 in disk 162.

In the operation of this embodiment of the invention, it will be apparent that each time solenoid core 92 is drawn upwardly, liquid will be forced upwardly to unseat check valve disk 156 and to pass upwardly through sleeve 148 and passage 146 to raise piston 170 a predetermined amount. Upon reclosing of the interrupter following such a first circuit opening operation, check valve disk 156 will automatically cover inlet passage 154 to cylindrical sleeve 160 so that the dashpot in which core 92 operates will delay reclosing movement of the core and contacts. If the circuit condition which caused opening of the interrupter has disappeared upon such a first circuit closing operation, piston 170 with its rod 166, 168 will slowly settle back to the position shown in Fig. 4 due to the action of gravity, but this movement will be slow due to the necessity of displacing liquid trapped below the piston through the relatively small clearance between it and the inner walls of sleeve 160. However, if the overload which caused circuit opening still exists upon the first reclosing operation, solenoid core 92 will again be drawn upwardly and, depending upon the relative lengths of rod 168 and sleeve 160, this opening operation may like the first operation occur relatively rapidly since there is substantially no opposition to the flow of liquid through passage 146 because piston 170 is free to move upwardly. As in the embodiment of the invention shown in Figs. 1 and 2, the parts may be adjusted so that only the first or the first two circuit opening operations in any sequence of closely successive operations occur relatively rapidly. In either case, piston rod 168 will eventually be advanced to the point where it enters opening 164 with which it has a relatively close fit. It will be apparent that upon an attempted immediate reopening of the circuit, upward travel of core 92 will be delayed on this and subsequent closely successive circuit opening operations because piston 170 can no longer move upwardly freely.

Irrespective of whether the circuit opening operations occur relatively rapidly or whether they are delayed, piston 170 is nevertheless advanced on each circuit opening operation until eventually the shoulder 167 at the upper end of piston rod 168 engages toggle lever 38 to move it upwardly over center and permit spring 36 to maintain the circuit interrupter contacts at an open circuit position. In order to prevent resetting of piston 170 while the breaker contacts are thus maintained at an open circuit position, a bowed leaf spring 172 is mounted at one side of actuating lever 52 as by pins 174, and positioned on the lever so as to engage extension 166 of piston rod 168 when the latter is at a position wherein it is about to enter opening 164 at the upper end of cylindrical sleeve 160. At the position of the parts (dotted lines, Fig. 4) where the breaker contacts are maintained at their open circuit position, spring 172 will engage the adjacent edge of rod extension 166 to thus move it in one direction and cause binding of piston 170 in its sleeve 160 so that no resetting thereof is possible until the interrupter is manually operated. By this arrangement, it is apparent that a single counting mechanism is provided for accomplishing two purposes, namely, (1) holding the counting mechanism at a position wherein an immediate attempt to reopen the circuit will be delayed after manual reclosure, and (2) holding a counting member substantially at the position where the first circuit opening operation following manual reclosure will cause the contacts to be maintained separated. These two results thus obtained in accordance with this invention are to provide, especially in fluid actuated counting mechanism for automatic circuit reclosing interrupters, a means for preventing rapid opening of the contacts immediately following manual closing of the contacts, which means also causes the contacts to be maintained separated following the first operation of the interrupter immediately after a manual circuit closing operation. The second feature is desirable to prevent repeated operation of the interrupter if it is manually reclosed on the same fault which originally caused it to be maintained at open circuit position. The particular functions outlined above are accomplished in accordance with this invention by a single device in the species of invention shown in Figs. 3, 4 and 5, and with two separate devices in the species of invention shown in Figs. 1 and 2.

Having described preferred embodiments of this invention in accordance with the patent statutes, it is desired that the invention be not limited to these particular structures, inasmuch as it will be readily apparent to persons skilled in the art that many modifications and changes can be made in these particular structures without departing from the broad spirit and scope of this invention.

I claim as my invention:

1. In a circuit interrupter, separable contacts, overload-responsive means for causing separation of said contacts, means for automatically closing said contacts after a circuit interrupting operation, counting means responsive only to a cycle of a predetermined number of closely successive operations of said interrupter contacts for automatically maintaining said contacts separated, manually operable means for closing said contacts after they have been maintained separated, normally ineffective time delay means, means actuated by said counting means to automatically render said time delay means effective to delay separation of said contacts by said overload-responsive means only on later operations in any such cycle of operations, said counting means being biased to automatically reset, means delaying resetting movement of said counting means for a predetermined time, and a part movable with said contacts and positioned to engage said counting means only when said contacts are substantially at their maintained separated position, whereby said counting means can reset only the aforesaid predetermined time after manual closing of the contacts so that an attempted circuit opening operation closely following manual closing will be delayed by said time delay means.

2. In a circuit interrupter, separable contacts, overload-responsive means for causing separation of said contacts, means for automatically closing said contacts after a circuit interrupting operation, means responsive only to a cycle of a predetermined number of closely successive operations of said interrupter contacts for automatically maintaining said contacts separated, manually operable means for closing said contacts after they have been maintained separated, normally ineffective fluid dashpot means associated with said contact separating means so as to be actuated upon separation of said contacts, fluid counting means communicating with said dashpot means to normally freely receive fluid displaced by operation of said dashpot means so that the latter does not normally delay contact movement, said counting means having means which is responsive to receipt of a predetermined amount of fluid from said dashpot means to restrict said fluid flow so that on subsequent closely succeeding operations contact separation will be delayed by said dashpot means, means biasing said counting means to reset, means delaying resetting movement of said counting means for a predetermined time, and a part movable with said contacts and positioned to engage said counting means when said contacts are maintained separated for preventing resetting of said counting means while said contacts are maintained separated, whereby said counting means can reset only the aforesaid predetermined time after manual closing of the contacts so that an attempted circuit opening operation closely following manual closing will be delayed by said time delay means.

3. In a circuit interrupter, separable contacts, overload-responsive means for causing separation of said contacts, means for automatically closing said contacts after a circuit interrupting operation, means responsive only to a cycle of a predetermined number of closely successive operations of said interrupter contacts for automatically maintaining said contacts separated, manually operable means for closing said contacts after they have been maintained separated, normally ineffective time delay means, counting means, means movable with said contacts for actuating said counting means, for counting the operations of said interrupter in any such cycle of operations, means actuated by said counting means to automatically render said time delay means effective to delay separation of said contacts by said overload-responsive means only on later operations in any such cycle of operations, said counting means being biased to automatically reset, means delaying resetting movement of said counting means for a predetermined time, and a separate part movable with said contacts and positioned when said contacts are separated to engage said counting means at least when said contacts are substantially at their maintained separated position for preventing resetting of said counting means, whereby said counting means can reset only a predetermined time after said contacts are closed so that an attempted circuit opening operation closely following manual closing will be delayed by said time delay means.

4. In a circuit interrupter, separable contacts, overload-responsive means for causing separation of said contacts, means for automatically closing said contacts after a circuit interrupting operation, fluid pumping means actuated on each operation of said interrupter, fluid actuated counting means communicating with said pumping means so as to be advanced a predetermined amount from a normal position in response to operation of said interrupter, said counting means being biased to slowly return to normal position, means responsive to advancement of said counting means a predetermined greater amount due to a plurality of closely successive operations of said interrupter to alter subsequent operation of the interrupter, and means movable with said contacts and positioned to mechanically engage said counting means at an open position of said contacts for preventing return of said counting means, whereby the latter can return toward normal position only when said contacts are not at said open position.

5. In a circuit interrupter, separable contacts, overload-responsive means for causing separation of said contacts, means for automatically closing said contacts after a circuit interrupting operation, fluid pumping means actuated on each operation of said interrupter, fluid actuated counting means communicating with said pumping means to be advanced a predetermined amount from a normal position in response to operation of said interrupter, said counting means being biased to slowly return, means responsive to advancement of said counting means a predetermined greater amount due to a plurality of closely successive operations of said interrupter to alter subsequent operation of the interrupter, and means movable with said contacts and positioned to engage said counting means at approximately the extreme open position of said contacts for preventing return of said counting means, whereby the latter can return toward normal position only when said contacts are not at said open position.

6. In a circuit interrupter, separable contacts, overload-responsive means for causing separation of said contacts, means for automatically closing said contacts after a circuit interrupting operation, fluid dashpot means actuated upon separation of said contacts, fluid counting means communicating with said dashpot means to normally freely receive fluid displaced by operation of said dashpot means so that the latter does not normally delay contact movement, means operated by said counting means when the latter is supplied with a predetermined amount of fluid from said dashpot means to impede the free flow of fluid from said dashpot means to said counting means, so that on subsequent closely succeeding operations contact separation will be delayed by said dashpot means, means biasing said counting means to reset after a predetermined time, and means movable with said contacts and positioned to mechanically engage said counting means responsive to an open position of said contacts for preventing return of said counting means, whereby the latter can return toward normal position only when said contacts are not at said open position.

7. In a circuit interrupter, separable contacts, overload-responsive means for causing separation of said contacts, means for automatically closing said contacts after a circuit interrupting operation, fluid dashpot means actuated upon separation of said contacts, fluid counting means communicating with said dashpot means to normally freely receive fluid displaced by operation of said dashpot means so that the latter does not normally delay contact movement, means operated by said counting means when the latter is supplied with a predetermined amount of fluid from said dashpot means to impede the free flow of fluid from said dashpot means to said counting means, so that on subsequent closely succeeding operations contact separation will be delayed by said dashpot means, means biasing said counting means reset after a predetermined time, and means movable with said contacts and positioned to engage said counting means at approximately the extreme open position of said contacts.

8. In a circuit interrupter, separable contacts, overload responsive means for causing separation of said contacts, means for automatically closing said contacts after a circuit interrupting operation, fluid dashpot means actuated upon separation of said contacts, said dashpot means having a vent through which fluid is normally free to pass, counting means actuated on each operation of said interrupter to be advanced a predetermined amount from a normal position, said counting means being biased to slowly return to its normal position, and means responsive to advancement of said counting means an amount greater than said predetermined amount by a plurality of closely successive operations of said interrupter to prevent free passage of fluid from said vent, and means movable with said contacts and positioned to engage said counting means approximately at the extreme open position of said contacts to prevent return movement of said counting means whereby the latter can return toward normal position only when said contacts are not at said open position.

9. In a circuit interrupter, separable contacts, overload-responsive means for causing separation of said contacts, means for automatically closing said contacts after a circuit interrupting operation, normally ineffective time delay means, means for counting closely successive circuit opening operations of said interrupter, means actuated by said counting means to automatically render said time delay means effective to delay separation of said contacts by said overload-responsive means only on later operations in any such cycle of operations, said counting means being biased to automatically reset, means delaying resetting movement of said counting means for a predetermined time, and separate means movable with said contacts and positioned to engage said counting means when said contacts are at approximately their extreme separated position to prevent resetting of the counting means when said contacts are at an open circuit position.

10. An automatic reclosing circuit breaker comprising, separable contacts, means responsive to an overload on the circuit for automatically separating said contacts to open the circuit, means responsive to a circuit-opening operation for automatically closing said contacts, means responsive to a predetermined number of closely successive circuit-opening operations for maintaining said contacts separated, fluid pumping means actuated by said contact separating means for supplying fluid to a counter cylinder, a counting piston in said cylinder biased to a normal position from which it is advanced a predetermined amount by the fluid supplied by said pumping means on each circuit-opening operation of the breaker, a movable mechanical stop positioned to be engaged by said piston when advanced a farther amount by a number of closely succeeding circuit-opening operations of said breaker which is less than said predetermined number to prevent further movement of said piston, whereby the next closely succeeding circuit-opening operation will be delayed by the thus imposed resistance to fluid flow from said pumping means to said counting cylinder and means for manually securing said movable stop at a selected position.

JAMES M. WALLACE.

REFERENCES CITED

The following references are of record in the file of this patent:

UNITED STATES PATENTS

| Number | Name | Date |
|---|---|---|
| 508,652 | Thomson | Nov. 14, 1893 |
| 1,835,342 | Schnell et al. | Dec. 8, 1931 |
| 2,125,157 | Gamel | July 26, 1938 |
| 2,298,143 | May | Oct. 6, 1942 |
| 2,464,303 | Gesellschap | Mar. 15, 1949 |
| 2,468,498 | Kyle | Apr. 26, 1949 |
| 2,560,529 | Van Ryan et al. | July 10, 1951 |